United States Patent
Melanson

(10) Patent No.: US 9,326,332 B1
(45) Date of Patent: Apr. 26, 2016

(54) RIPPLE REDUCTION IN LIGHT EMITTING DIODE (LED)-BASED LIGHT BULB THROUGH INCREASED RIPPLE ON AN ENERGY STORAGE CAPACITOR

(71) Applicant: KONINKLIJKE PHILIPS N.V., Eindhoven (NL)

(72) Inventor: John L. Melanson, Austin, TX (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/509,660

(22) Filed: Oct. 8, 2014

(51) Int. Cl.
| | |
|---|---|
| H05B 37/00 | (2006.01) |
| H05B 39/00 | (2006.01) |
| H05B 41/14 | (2006.01) |
| H05B 33/08 | (2006.01) |
| H05B 37/02 | (2006.01) |
| H02M 3/24 | (2006.01) |

(52) U.S. Cl.
CPC ............ H05B 33/0803 (2013.01); H02M 3/24 (2013.01); H05B 37/02 (2013.01)

(58) Field of Classification Search
None
See application file for complete search history.

(56) References Cited

U.S. PATENT DOCUMENTS

| | | |
|---|---|---|
| 5,173,643 A | 12/1992 | Sullivan et al. |
| 6,510,995 B2 | 1/2003 | Muthu et al. |
| 6,696,803 B2 | 2/2004 | Tao et al. |
| 8,369,109 B2 | 2/2013 | Niedermeier et al. |
| 2009/0295300 A1 | 12/2009 | King |
| 2010/0213857 A1* | 8/2010 | Fan .............................. 315/186 |
| 2011/0309760 A1 | 12/2011 | Beland et al. |
| 2012/0146540 A1 | 6/2012 | Khayat et al. |
| 2012/0187997 A1 | 7/2012 | Liao et al. |
| 2014/0021874 A1* | 1/2014 | Chen ......................... 315/200 R |
| 2014/0354166 A1* | 12/2014 | Yu et al. ........................ 315/201 |

OTHER PUBLICATIONS

International Search Report and Written Opinion mailed Aug. 19, 2014, during examination of PCT/US2014/032736.

\* cited by examiner

*Primary Examiner* — Anh Tran

(57) ABSTRACT

A buck stage configured as a second stage of a lamp circuit for a light-emitting diode-based (LED-based) light bulb may reduce manufacturing costs associated with the bulb by reducing a size of a capacitor in the lamp circuit. A controller of the buck stage may adjust a duty cycle of a switch to increase a ripple, such as a voltage ripple, across the capacitor to increase accessibility of energy stored in the capacitor and decrease a ripple, such as in output current, to the LEDs.

25 Claims, 5 Drawing Sheets

RIPPLE REDUCTION IN LIGHT EMITTING DIODE (LED)-BASED LIGHT BULB THROUGH INCREASED RIPPLE ON AN ENERGY STORAGE CAPACITOR

FIELD OF THE DISCLOSURE

The instant disclosure relates to lighting circuits. More specifically, this disclosure relates to power supply circuitry for lighting circuits.

BACKGROUND

Alternative lighting devices to replace incandescent light bulbs differ from incandescent light bulbs in the manner that energy is converted to light. Incandescent light bulbs include a metal filament. When electricity is applied to the metal filament, the metal filament heats and glows, radiating light into the surrounding area. The metal filament of conventional incandescent light bulbs generally has no specific power requirements. That is, any voltage and any current may be applied to the metal filament because the metal filament is a passive device. Although the voltage and current need to be sufficient to heat the metal filament to a glowing state, any other characteristics of the delivered energy to the metal filament do not affect operation of the incandescent light bulb. Thus, conventional line voltages in most residences and commercial buildings are sufficient for operation of the incandescent bulb. However, incandescent bulbs are not very efficient in conversion of energy to light, and thus waste energy.

One alternative lighting device with better efficiency is a light-emitting diode based bulb (LED-based bulb). The LEDs in the bulb consume energy from a line input source and convert the energy to light through photoemission. However, the LEDs, unlike the metal filament, are not a passive component. Whereas the metal filament presents a nearly constant resistance to the line voltage source and can operate from AC voltages, LEDs are DC devices that need to have a controlled supply current. The controlled supply current is conventionally supplied by one or more power stages placed between the LEDs and the line voltage source. The power stages convert energy from the line voltage source to an appropriate input for the LEDs. The power stages also regulate the conversion of energy from the line voltage to the LEDs by regulating current through the LEDs because the emitted light is proportional to the current.

Line voltage sources are generally alternating current (AC) waveforms. Because the voltage at the line source varies with time, the energy available to the LED-based bulb also varies over time. Without control over the conversion of energy within the LED-based bulb, the light output of the LED-based bulb would ripple over time along with the variations at the line voltage source. One conventional lamp circuit for controlling a LED-based bulb to reduce variations is shown in FIG. 1.

FIG. 1 is a circuit schematic illustrating a conventional two-stage, line-operated lamp circuit. In circuit 100, a line voltage input node 102 is coupled to rectifiers 110, which convert alternating current (AC) at input node 102 to direct current (DC) for output to a first stage DC-DC converter 112. First stage 112 delivers a peak power to capacitor 114 of approximately double the average power consumed by light-emitting diodes (LEDs) 104. A second stage DC-DC converter 116 consumes energy stored in the capacitor 114 and generates a constant current to drive the LEDs 104. Although the circuit 100 provides a constant current with little ripple to the LEDs 104, the circuit 100 includes two power converters, which increases the final cost of an LED-based bulb containing the circuit 100.

An alternate lamp circuit with only a single power converter for performing a power factor correction (PFC) is shown in FIG. 2. FIG. 2 is a circuit schematic illustrating another conventional line-operated lamp circuit with a single stage. A circuit 200 receives line voltage input at node 102, which is provided to rectifier 110. The DC output of the rectifier 110 is provided to capacitor 114 in parallel with transformer 212 and switch 216. The capacitor 114 is a relatively small capacitor, such as 10-500 nanoFarads. The transformer 212 delivers energy from the rectifier 110 to the capacitor 214 and isolates capacitor 214 from the rectifier 110. The capacitor 214 stores energy during peaks in the output of rectifier 110 and discharges energy during the troughs in the output of rectifier 110 to LEDs 104. The LEDs 104 have small resistances to improve the efficiency of conversion of energy to light. Thus, to reduce ripple in the current at LEDs 104, the capacitor 214 must have a large capacitance. The physical size of capacitor 214 increases proportional to capacitance. Thus, the circuit 200 can become costly to manufacture and occupy too much space when capacitor 214 is large. To reduce cost, the capacitor 214 is generally decreased in size, but the size reduction results in larger ripples in current through the LEDs 104, and consequently ripples in the brightness of light output by the LEDs 104. Further, the LEDs 104 have a minimum required voltage, the forward bias voltage, in order to maintain the generation of light. Because the capacitor 214 acts as the energy supply for maintaining the forward bias voltage, the capacitor 214 must be a relatively large capacitor 214. Additionally, other characteristics of the LEDs 104 place requirements on the size of the capacitor 214 in the design of FIG. 2 based on, for example, the non-linearity of the LEDs 104. Although the solution of FIG. 2 resolves the problem of too much ripple in the output light, the circuit 100 is too costly to implement in low-cost devices, such as low-cost consumer light bulbs.

Shortcomings mentioned here are only representative and are included simply to highlight that a need exists for improved lamp circuits particularly for LED-based light bulbs. Embodiments described here address certain shortcomings but not necessarily each and every one described here or known in the art.

SUMMARY

Output ripple from a LED-based light bulb may be reduced through the use of a two-stage power converter with reduced cost by increasing a voltage ripple on a storage capacitor to decrease current ripple in the LEDs. By allowing an increased ripple voltage on the capacitor, more of the energy storage potential of the capacitor may be utilized for generating light at the LEDs. For example, the required forward bias voltage of the LEDs places a required minimum stored charge on the capacitor, which significantly reduces the available energy in the capacitor. In one illustration of this restriction, when the required forward bias voltage is 27 Volts and the capacitor is charged to 29 Volts, the only energy available in the capacitor is that which when consumed does not reduce the capacitor below 27 Volts. Increasing a ripple on the capacitor above 29 Volts may unlock more energy storage potential of the capacitor. Because a larger amount of the energy storage potential of the capacitor may be utilized, a smaller capacitor may be used in the lamp circuit of the light bulb. The smaller capacitor allows for smaller lamp circuits and lower-cost lamp circuit to be implemented in LED-based light bulbs. Further, the second stage power converter may be manufactured at lower cost than in conventional two-stage converters. The increased voltage ripple on the capacitor may be obtained by a controller coupled to a switch in series with the LEDs. The controller may adjust a duty cycle of the switch, but maintain an approximately constant average duty cycle over at least a half of a cycle of the line input voltage.

According to one embodiment, an apparatus may include a line voltage input node configured to receive a line voltage input; a rectifier coupled to the line voltage input node; a first switching stage coupled to the rectifier and configured to regulate a current to an intermediate node; a capacitor coupled to the intermediate node; a second switching stage coupled to the intermediate node and configured to provide an approximately constant ratio of input to output current; and/or a first controller coupled to the first switching stage and configured to regulate the first switching stage to maintain an approximately average current out of the first switching stage and into the intermediate node, the average current being averaged over each half line cycle of the input line voltage.

In certain embodiments, the second switching stage may include a switch configured in series with a lighting load; the second switching stage may include a second controller coupled to the switch; the lighting load may include one or more light emitting diodes (LEDs); the controller may be integrated into a printed circuit board (PCB); the first switching stage may be integrated into a second printed circuit board (PCB); the second controller may be configured to operate the second switching stage at approximately a constant average duty cycle over a period of at least one half of a cycle of the line voltage input; the second controller may be configured to operate the switch to control a ripple on the capacitor to reduce a ripple through the lighting load; the second controller may be configured to operate the switch to control a voltage ripple on the capacitor to reduce a current ripple through the lighting load; the second controller may be configured to monitor a voltage across the capacitor; the second controller may be configured to reduce a power usage of the lighting load during a peak of the monitored voltage to allow the capacitor to charge; the second controller may be configured to reduce a duty cycle of the switch to reduce the power usage of the lighting load; the second controller may be configured to monitor a current through the lighting load; the second controller may be configured to charge the capacitor when the current through the lighting load is below a threshold; the first switching stage may be galvanically isolated from the second switching stage; the second switching stage may operate at a higher operating frequency than the first switching stage; the first controller may be configured to maintain an approximately average current based, at least in part, on a dimmer setting for the lighting load; and/or the first controller may be configured to regulate a current through the one or more light emitting diodes (LEDs) as a value approximately equal to the product of the average current from the first switching stage and the ratio of the second switching stage.

According to another embodiment, a method may include regulating a current to an intermediate node in a first switching stage of a lamp to maintain an approximately average current for each half line cycle of an input line voltage; delivering current from the intermediate node to a second switching stage of the lamp; and/or regulating a ripple in an energy storage capacitor of the second switching stage of the lamp to provide an approximately constant ratio of input to output current. In certain embodiments, the approximately constant ratio may be greater than one; and/or the regulated ripple may be a regulated voltage ripple.

In some embodiments, the method may also include monitoring a voltage across the energy storage capacitor; reducing an output current during a peak of the monitored voltage to allow the energy storage capacitor to charge; the step of delivering current from the intermediate node to the second switching stage may include galvanically isolating the second switching stage from the first switching stage; the step of regulating a voltage ripple may include regulating an output current to have a current ripple less than approximately 20%; rising regulating a current through one or more light emitting diodes (LEDs) as a value approximately equal to the product of the average current from the first switching stage and the ratio of the second switching stage; and/or the step of regulating the current may include maintaining an approximately average current based, at least in part, on a dimmer setting for the lamp.

According to a further embodiment, an apparatus may include a first printed circuit board (PCB) and a second printed circuit board (PCB) galvanically isolated from the first printed circuit board (PCB). The first PCB may include a line voltage input node configured to receive a line voltage input; a rectifier coupled to the line voltage input node; a first switching stage coupled to the rectifier and configured to maintain an approximately average current for each one half of a cycle of the input live voltage; and/or a transformer coupled to the first switching stage. The second PCB may include a lighting output node configured to provide an output current; a second switching stage coupled to the transformer to receive an input current from the first printed circuit board (PCB) and configured to provide an approximately constant ratio of input current to output current; and/or a controller coupled to the second switching stage and configured to operate the second switching stage at approximately a constant average duty cycle over a period of at least one half of a cycle of the line voltage input. In some embodiments, the apparatus may also include one or more light emitting diodes (LEDs) coupled to the lighting output node.

In certain embodiments, the second switching stage of the second printed circuit board (PCB) may include an energy storage capacitor; the controller of the second switching stage may be configured to control a voltage ripple on the energy storage capacitor to reduce a current ripple at the lighting output node; and/or the second switching stage of the second printed circuit board (PCB) may be coupled to the first switching stage of the first printed circuit board (PCB) by two wires.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
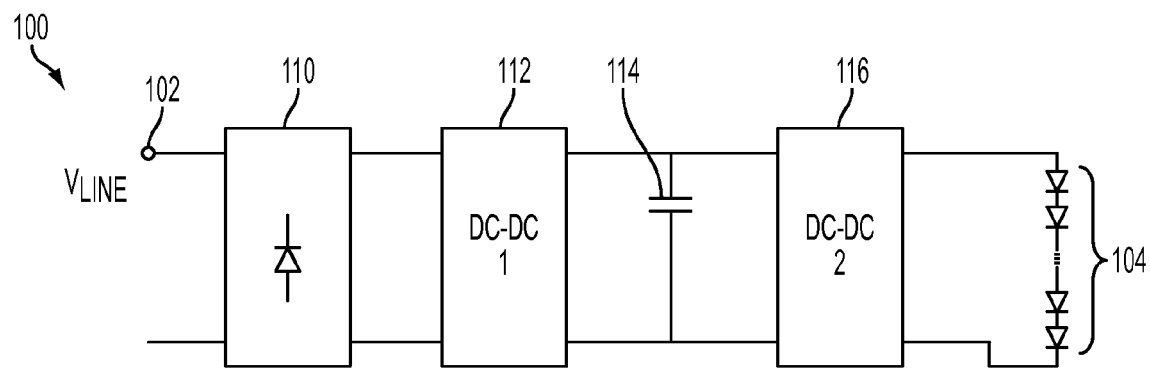
FIG. 1 is a circuit schematic illustrating a conventional two-stage, line-operated lamp circuit.
Figure 2:
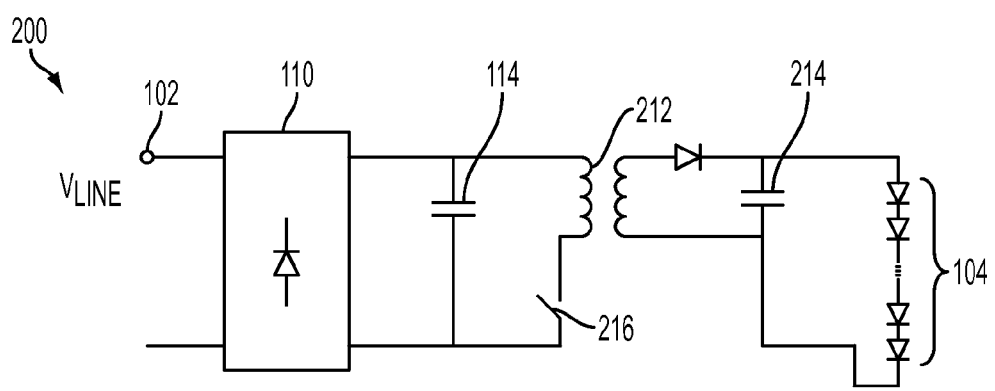
FIG. 2 is a circuit schematic illustrating another conventional line-operated lamp circuit with a single stage.
Figure 3:
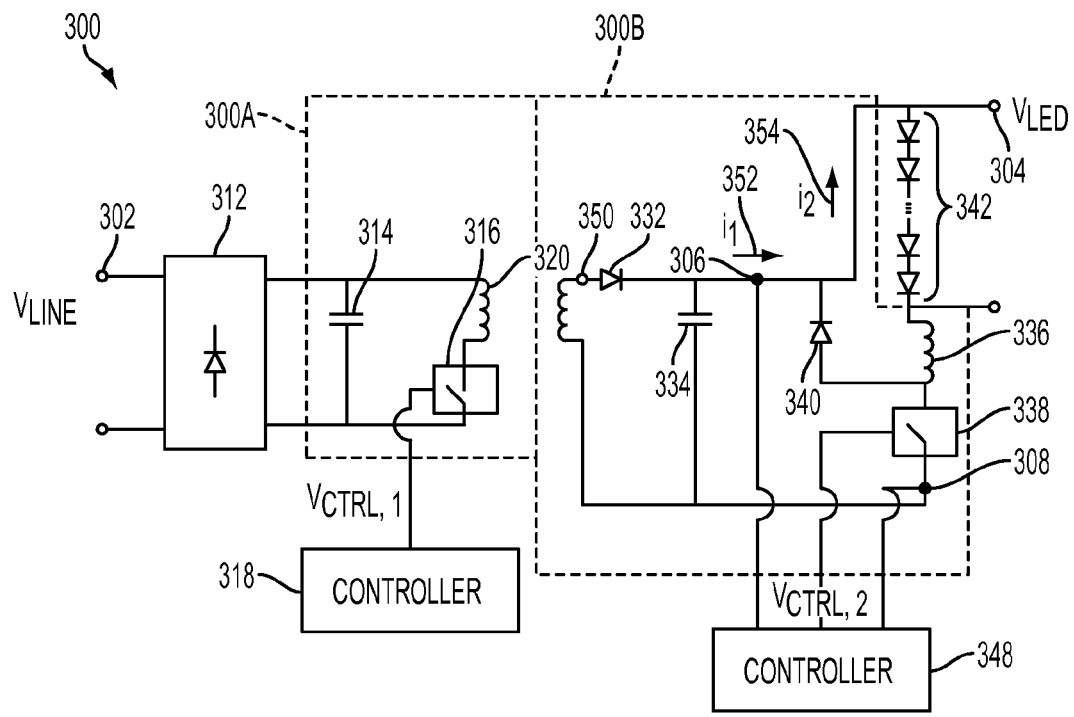
FIG. 3 is a circuit schematic illustrating a two-stage lamp circuit with controllable voltage ripple on a storage capacitor according to one embodiment of the disclosure.

FIG. 3 is a circuit schematic illustrating a two-stage lamp circuit with controllable voltage ripple on a storage capacitor according to one embodiment of the disclosure. A circuit 300 may include a line voltage input node 302 coupled to a rectifier 312. The rectifier 312 converts an alternating current (AC) input from line voltage $V_{LINE}$ to a direct current (DC) output for a first stage power converter 300A. The capacitor 314 may filter the DC output of the rectifier 312, such as to reduce electromagnetic interference (EMI). A transformer 320 may couple the DC output of the rectifier 312 to a second stage power converter 300B. The power converter 300A may operate at a different switching frequency than the power converter 300B. In one embodiment, the switching frequency of 300B is higher than that of converter 300A.

A switch 316 in series with one winding of the transformer 320 may be operated by a controller 318 to control delivery of current to an intermediate node 350. Adjusting a duty cycle of the switch 316 from the controller 318 may change a level of average current output by the transformer 320 to the intermediate node 350. In one embodiment, the controller 318 may adjust the duty cycle of the switch 316 to maintain an approximately average current for each half line cycle of the line voltage at input node 302.

Current from the intermediate node 350 may power the second stage power converter 300B. In converter 300B, current may flow through a diode 332 to charge a capacitor 334. Current $i_1$ 352 may flow from the intermediate node 350 and from charge stored on the capacitor 334. The current $i_1$ 352 continues as current $i_2$ 354 to generate an output voltage $V_{LED}$ for LEDs 342. The current through the LEDs 342 may also flow through inductor 336.

A switch 338 coupled to the inductor 336 may determine how current flows from the inductor 336. When the switch 338 is closed, some current may loop from the LEDs 342 to the capacitor 334 through the switch 338. When the switch 338 is open, all current may loop from the LEDs 342, through the inductor 336 to the diode 340, and back through the LEDs 342. By operating the switch 338, a controller 348 may adjust a ratio of input current into the intermediate node 350 to output current through the LEDs 342. In one embodiment, the controller 348 may operate the switch 338 to provide an approximately constant ratio of input to output current. The controller 348 may maintain the approximately constant ratio, which may be greater than one, by monitoring a voltage at node 306 and/or a current at node 308. The controller 348 may generate a control signal $V_{CTRL,2}$ for operating the switch 338 based, in part, on the sensed voltage at node 306 and current at node 308. For example, the controller 348 may reduce a power usage of the lighting load during a peak of the monitored voltage to allow the capacitor 334 to charge. In another example, the controller 348 may charge the capacitor 334 when the monitored current at node 308 is below a threshold level.

Figure 4:
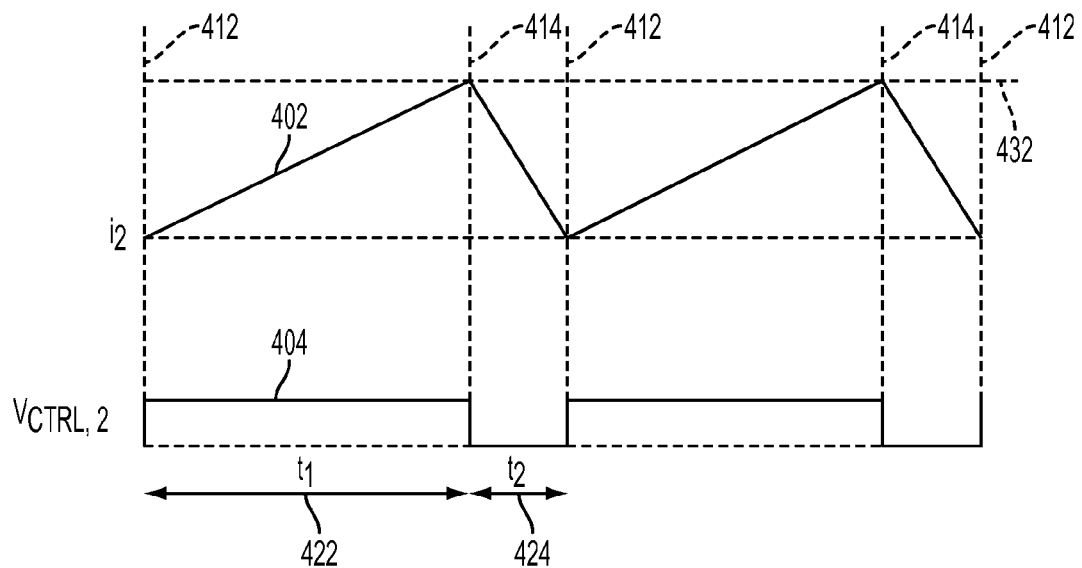
FIG. 4 are graphs illustrating operation of the controller maintaining an approximately constant average current according to one embodiment of the disclosure.

FIG. 4 are graphs illustrating operation of the controller maintaining an approximately constant average current according to one embodiment of the disclosure. A graph 402 illustrates a current $i_2$ 354 through the LEDs 342 and the inductor 336. A graph 404 illustrates the control signal $V_{CTRL,2}$ for operating the switch 338. When the switch 338 is closed at time 412, the current $i_2$ 354 increases linearly as inductor 336 is charged. The controller 348 monitors current at node 308. When the controller 348 determines the current $i_2$ 354 reaches a certain threshold 432, by detecting a proportionate amount of current at node 308, the controller 348 may open the switch 338. At time 414, the switch 338 opens when the signal 404 goes to a low state. As a result, current 402 decreases as the inductor 338 is discharged through the LEDs 342. The average current for $i_1$ 352 over at least a half line cycle may be approximately equal to the current $i_2$ 354 multiplied by a duty cycle, d, of the switch 338 (see "d" in FIG. 5).

The timing of operation of the switch 338 may change to maintain an approximately constant average current through the LEDs 342. The average current may be set by a ratio of time the switch is closed to time the switch is open. In FIG. 4, the time period 422 is a first time period during which the switch 338 is closed, and the time period 424 is a second time period during which the switch 338 is open. A ratio of the time period 422 to the time period 424 may be defined as a duty cycle of the switch 338. The ratio may be adjusted by the controller 348, which changes when the switch 338 closes with the control signal $V_{CTRL,2}$. One example of this changing duty cycle over a full cycle of the line voltage is shown in FIG. 5.

Figure 5:
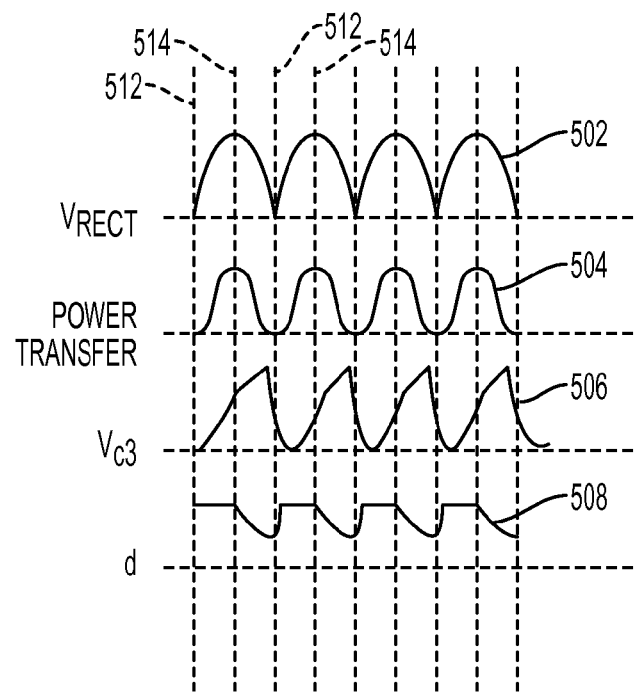
FIG. 5 are graphs illustrating operation of a power converter for a LED-based light bulb over a cycle of a line voltage source according to one embodiment of the disclosure.

FIG. 5 are graphs illustrating operation of a power converter for a LED-based light bulb over a cycle of a line voltage source according to one embodiment of the disclosure. A graph 502 illustrates a rectified voltage $V_{RECT}$ output by the rectifier 312. The rectified voltage 502 follows the alternating current (AC) input at input node 302. Graph 504 shows the power transfer from the line voltage source to the lamp circuit. Graph 506 shows a voltage $V_{C3}$ across capacitor 334. Graph 508 shows a duty cycle d of the switch 338 set by the controller 348. At time 512, the line cycle begins and the rectified voltage $V_{RECT}$ of graph 502 increases with the line voltage. During this portion of the line cycle, the duty cycle of graph 508 may be at a maximum, such as at a duty cycle of 1.0. A duty cycle of 1.0 allows a maximum amount of energy to be stored from the line voltage source in capacitor 334. At time 514, the line voltage source, and consequently the rectified voltage $V_{RECT}$ of graph 502, decreases into a trough. Less energy is available during this decline and in the trough. Thus, the controller 348 may decrease the duty cycle shown in graph 508.

The duty cycle may be adjusted by the controller 348 while maintaining an average duty cycle. In one embodiment, the duty cycle may vary from 0.9-1.0 and have an average value of 0.95. The average current through the LEDs 342 may be determined as the average current provided by transformer 320 divided by the average duty cycle. When the average duty cycle is fixed by the controller 348, the controller 318 may be used to adjust a current through the LEDs 342. For example, the controller 318 may adjust a duty cycle of the switch 316 to adjust transfer of power from the first stage 300A to the second stage 300B.

Referring to FIG. 3, the controller 318 and the controller 348 may be independent controllers. Thus, for example, the controller 348 and the second stage 300B may be added to a power converter having the first stage 300A. The second stage 300B may thus be connected through only two wires to transformer 320. In one embodiment, a LED-based light bulb constructed with circuit 300 of FIG. 3 may include diode 332, inductor 336, switch 338, and controller 348 integrated into a light engine board along with LEDs 342. In another embodiment, the controller 318 and the controller 348 may be integrated into a single controller.

The circuit 300 of FIG. 3 may allow construction of a lamp circuit for an LED-based bulb with a reduced current ripple in the LEDs 342 similar to that achieved with prior art two-stage power converters, but with a reduced cost similar to that achieved with prior art one-stage power converters. In particular, the second stage 300B of circuit 300 may be manufactured at lower cost than a conventional second stage power converter. Current ripple through the LEDs 342 may be reduced by controlling a duty cycle of the switch 338 from the controller 348 to allow a higher voltage ripple on capacitor 334. In one embodiment, current ripple may be reduced below 20% for ideal light generation from LEDs 342. A higher voltage ripple on the capacitor 334 may allow better utilization of the energy storage capacity of the capacitor 334, and thus may allow a smaller capacitor 334 to be used in the circuit 300. An increase of approximately double the voltage ripple on the energy storage capacitor may allow a reduction of size of the capacitor by half. Smaller capacitors have a reduced cost and allow the LED-based light bulb to be constructed in a smaller physical volume.

Increasing the voltage ripple to allow use of a smaller capacitor is illustrated in the example below. If the LEDs 342 operate at 27 Volts, then the capacitor 334 must be maintained above 27 Volts for the LEDs to operate. Energy stored in a capacitor, E, may be calculated as $$E = \frac{CV^2}{2},$$

where C is a capacitance of capacitor 334 and V is a voltage across the capacitor 334. A larger voltage ripple may increase the energy stored by the capacitor 334 by increasing V. A larger energy store within the circuit 300 may allow a lower ripple of current through the LEDs 342. For example, when a voltage ripple of 2 Volts is allowed across the capacitor 334, the available energy in the capacitor 334 is the difference between the energy stored by the capacitor at 29 Volts and the energy stored by the capacitor at 27 Volts. Energy stored in the capacitor when the voltage decreases below 27 Volts is not available because the LEDs 342 do not operate below 27 Volts. Thus, the energy accessible by the LEDs 342 in the capacitor at a 2 Volt ripple is $$E_{29V} - E_{27V} = \frac{C(29)^2}{2} - \frac{C(27)^2}{2} = 56C,$$

where C is the capacitance of capacitor 334. When a voltage ripple of 4 Volts is allowed across the capacitor 334, the available energy in the capacitor is $$E_{31V} - E_{27V} = \frac{C(31)^2}{2} - \frac{C(27)^2}{2} = 116C,$$

where C is the capacitance of capacitor 334. In this example, a ripple increase of 2 Volts on the capacitor 334 produces an approximate doubling of the usable energy storage of the capacitor 334 for the same capacitance. Thus, the capacitance, and therefore size, of the capacitor 334 may be reduced while maintaining a certain level of energy storage in the circuit 300.

Further, reductions in size may be achieved with the controller 348. For example, the controller 348 may operate the switch 338 at a high switching frequency and a high duty cycle to allow the size of inductor 336 to be reduced. Reducing the size of the inductor 336 further allows a reduction in cost of the circuit 300 and a reduction in the physical volume of an LED-based light bulb.

Figure 6:
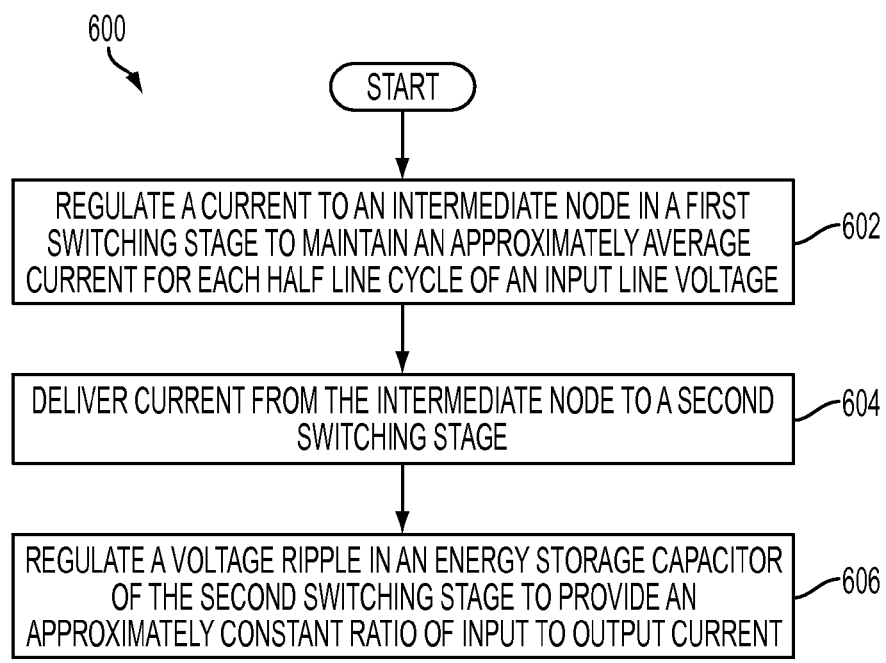
FIG. 6 is a flow chart illustrating a method of powering a LED-based bulb with a two stage power converter with an increased voltage ripple on a storage energy capacitor according to one embodiment of the disclosure.

Operation of the circuit 300 to deliver a nearly constant current to LEDs 342 is described in FIG. 6. FIG. 6 is a flow chart illustrating a method of powering a LED-based bulb with a two stage power converter with an increased voltage ripple on a storage capacitor according to one embodiment of the disclosure. A method 600 begins at block 602 with regulating a current to an intermediate node in a first switching stage to maintain an approximately average current for each half-line cycle of an input line voltage. At block 604, current may be delivered from the intermediate node to a second switching stage, including an energy storage capacitor. At block 606, a voltage ripple in the energy storage capacitor may be regulated to provide an approximately constant ratio of input to output current at the second switching stage. In one embodiment, a controller may monitor a voltage across the energy storage capacitor, such as capacitor 334, and operate a switch, such as switch 338, to regulate a ripple on the capacitor. The output current of the second switching stage may be provided to LEDs. By regulating the voltage ripple on the energy storage capacitor to increase accessibility of energy storage within the circuit 300, the current ripple through the LEDs 342 may be reduced and a more constant light output from the LEDs 342 may be obtained.

Figure 7:
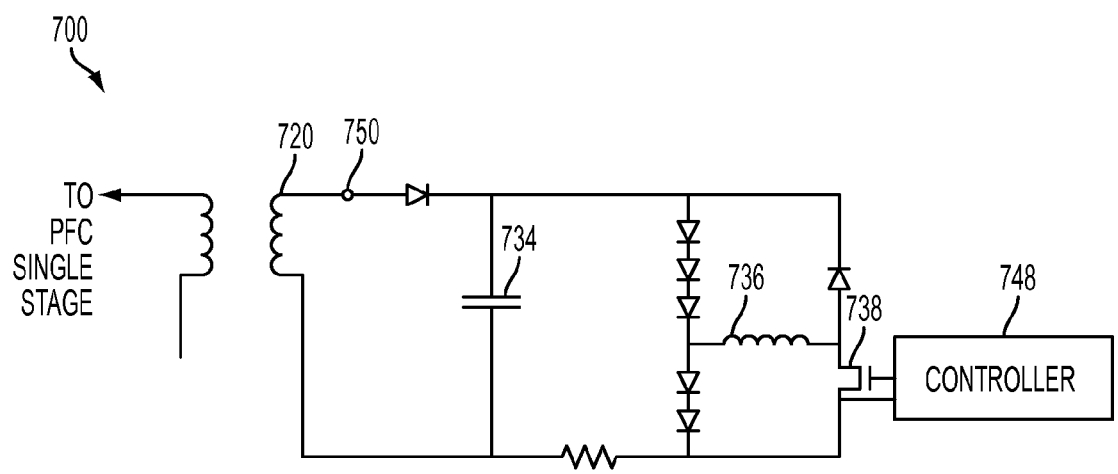
FIG. 7 is a circuit illustrating a second stage configuration to reduce current ripple through LEDs according to one embodiment of the disclosure.

A controller for regulating voltage ripple on a storage capacitor may be implemented in other power converter configurations. For example, a second stage may be modified to include a capability to short some of the diodes during a trough of the line voltage. FIG. 7 is a circuit illustrating a second stage configuration to reduce current ripple through LEDs according to one embodiment of the disclosure. A circuit 700 may include a transformer 720 coupled by one winding to a PFC single stage (not shown). A second winding of the transformer 720 may couple to intermediate node 750 and to the capacitor 734. A controller 748 may be coupled to a switch 738, which is coupled to inductor 736. The capacitor 734 may store energy when power transfer from a line voltage source in the PFC single stage is high, such as during peaks in the source waveform. When the power transfer is decreasing or in a trough, the controller 748 may operate the switch 738 to buck capacitor 734 to provide energy to the inductor 736, and thus light emitting diodes (LEDs). Energy provided by the capacitor 734 may reduce current ripples through the light emitting diodes (LEDs), and consequently reduce variations in light output from the LED-based light bulb.

Figure 8:
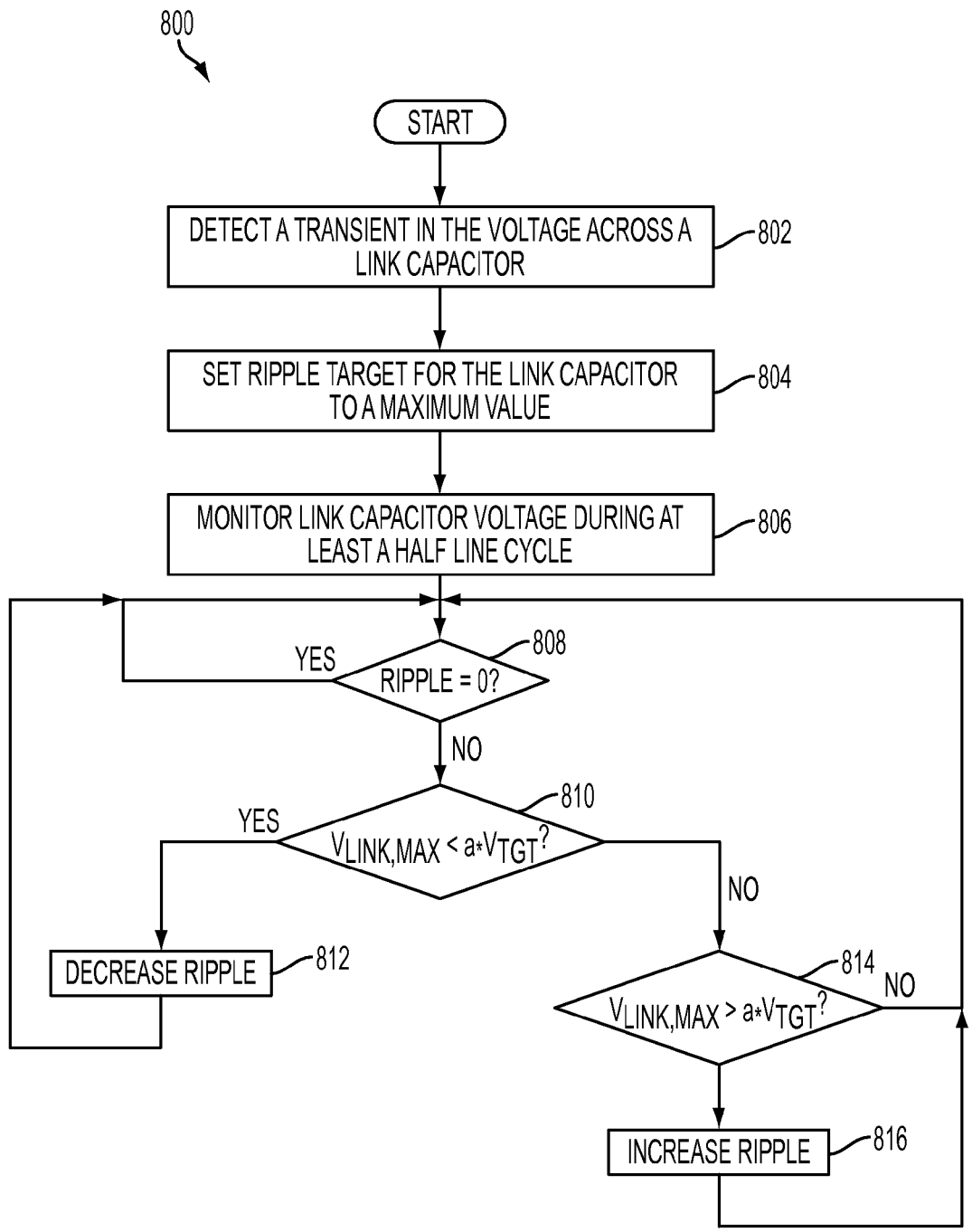
FIG. 8 is a flow chart illustrating a method of controlling a voltage ripple on an energy storage capacitor according to one embodiment of the disclosure.

The controller 748 of FIG. 7 or the controller 348 of FIG. 3 may execute an algorithm for controlling a voltage ripple on the energy storage capacitor 734 of FIG. 7 and the capacitor 334 of FIG. 3, or link capacitor. FIG. 8 is a flow chart illustrating a method of controlling a voltage ripple on an energy storage capacitor according to one embodiment of the disclosure. A method 800 begins at block 802 with detecting a transient in the voltage across the link capacitor. At block 804, a voltage ripple target is set for the link capacitor to a first value, which may be a maximum value. At block 806, the controller may monitor the link capacitor voltage during at least a half of a line cycle. At block 808, it is determined whether the voltage ripple is zero. If so, the method 800 may wait at block 808. When the voltage ripple exists, the method 800 proceeds to block 810. At block 810, the link capacitor maximum voltage $V_{LINK,MAX}$ may be compared to the result of a target voltage $V_{TGT}$ with a scaling factor a, where the product of $a*V_{TGT}$ is a predetermined threshold of maximum allowable voltage on the capacitor that may be set to a value approximately equal to a rated maximum voltage for the capacitor. If the $V_{LINK,MAX}$ value is less than the result, then the ripple on the link capacitor may be decreased at block 812. If the $V_{LINK,MAX}$ value is not less than the result, then the method 800 proceeds to block 814. At block 814, the $V_{LINK,MAX}$ value is compared to the result to determine if the $V_{LINK,MAX}$ value is greater than the result. If so, then the voltage ripple on the link capacitor is increased at block 816. If not, then the method 800 returns to block 808. The method 800 may continue through the blocks 808, 810, and 814, for the duration of the half of a line cycle. If the link capacitor voltage reaches $V_{TGT}$, which is larger than $a*V_{TGT}$ prior to a disconnect time of a dimmer providing current to the LED-based bulb, then the output may be immediately shut off until the disconnect time. The method 800 of FIG. 8 may allow monitoring of a maximum voltage on the capacitor over a half line cycle and increasing or decreasing the ripple on the capacitor based on the monitored maximum voltage. This method may further optimize the output ripple allowed on the capacitor and further improve the amount of energy storage available in the capacitor for use by the LEDs.

If implemented in firmware and/or software, the functions described above, such as illustrated in FIG. 6 and FIG. 8, may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electronically-erasable programmable read-only memory (EEPROM), compact disc-read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CDs), laser discs, optical discs, digital versatile discs (DVDs), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. For example, techniques described above may also be applied to linear regulators, in which a drive current may equal an output current to LEDs. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
a line voltage input node configured to receive a line voltage input;
a rectifier coupled to the line voltage input node;
a first switching stage coupled to the rectifier and configured to regulate an approximately average current to an intermediate node;
a capacitor coupled to the intermediate node;
a second switching stage coupled to the intermediate node and configured to provide an approximately constant ratio of input to output current, wherein the second switching stage comprises a switch in series with a lighting load;
a first controller coupled to the first switching stage and configured to regulate the first switching stage to maintain an approximately average current out of the first switching stage and into the intermediate node, the average current being averaged over each half line cycle of the input line voltage; and
a second controller coupled to the switch, wherein the second controller is configured to operate the switch to control a ripple on the capacitor to reduce a ripple through the lighting load.

2. The apparatus of claim 1, wherein the first switching stage is galvanically isolated from the second switching stage.

3. The apparatus of claim 2, wherein the second switching stage operates at a higher operating frequency than the first switching stage.

4. The apparatus of claim 1, wherein the lighting load comprises one or more light emitting diodes (LEDs).

5. The apparatus of claim 4, wherein the first controller is configured to regulate a current through the one or more light emitting diodes (LEDs) as a value approximately equal to the product of the average current from the first switching stage and the ratio of the second switching stage.

6. The apparatus of claim 1, wherein the controller is integrated into a printed circuit board (PCB) and wherein the first switching stage is integrated into a second printed circuit board (PCB).

7. The apparatus of claim 1, wherein the second controller is configured to operate the second switching stage at approximately a constant average duty cycle over a period of at least one half of a cycle of the line voltage input.

8. The apparatus of claim 7, wherein the second controller is configured to:
monitor a voltage across the capacitor; and
reduce a power usage of the lighting load during a peak of the monitored voltage to allow the capacitor to charge.

9. The apparatus of claim 8, wherein the second controller is configured to reduce a duty cycle of the switch to reduce the power usage of the lighting load.

10. The apparatus of claim 7, wherein the second controller is configured to:
monitor a current through the lighting load; and
charge the capacitor when the current through the lighting load is below a threshold.

11. The apparatus of claim 1, wherein the second controller is configured to operate the switch to control a voltage ripple on the capacitor to reduce a current ripple through the lighting load.

12. The apparatus of claim 1, wherein the first controller is configured to maintain an approximately average current based, at least in part, on a dimmer setting for the lighting load.

13. A method, comprising:
regulating a current to an intermediate node in a first switching stage of a lamp to maintain an approximately average current for each half line cycle of an input line voltage;
delivering current from the intermediate node to a second switching stage of the lamp; and
regulating a ripple in an energy storage capacitor of the second switching stage of the lamp to provide an approximately constant ratio of input to output current.

14. The method of claim 13, wherein the step of regulating comprises regulating a voltage ripple in the energy storage capacitor.

15. The method of claim 13, wherein the approximately constant ratio is greater than one.

16. The method of claim 13, further comprising monitoring a voltage across the energy storage capacitor.

17. The method of claim 16, further comprising reducing an output current during a peak of the monitored voltage to allow the energy storage capacitor to charge.

18. The method of claim 17, wherein the step of delivering current from the intermediate node to the second switching stage comprises galvanically isolating the second switching stage from the first switching stage.

19. The method of claim 13, wherein the step of regulating a voltage ripple comprises regulating an output current to have a current ripple less than approximately 20% of an average voltage on the energy storage capacitor.

20. The method of claim 13, wherein the step of regulating the current to the intermediate node comprises maintaining an approximately average current based, at least in part, on a dimmer setting for the lamp.

21. The method of claim 13, further comprising regulating a current through one or more light emitting diodes (LEDs) as a value approximately equal to the product of the average current from the first switching stage and the ratio of the second switching stage.

22. An apparatus, comprising:
a first printed circuit board (PCB):
a line voltage input node configured to receive a line voltage input;
a rectifier coupled to the line voltage input node;
a first switching stage coupled to the rectifier and configured to maintain an approximately average current for each one half of a cycle of the input live voltage;
a transformer coupled to the first switching stage; and
a second printed circuit board (PCB) galvanically isolated from the first printed circuit board (PCB), the second printed circuit board (PCB) comprising:
a lighting output node configured to provide an output current;
a second switching stage coupled to the transformer to receive an input current from the first printed circuit board (PCB) and configured to provide an approximately constant ratio of input current to output current; and
a controller coupled to the second switching stage and configured to operate the second switching stage at approximately a constant average duty cycle over a period of at least one half of a cycle of the line voltage input,
wherein the second switching stage of the second printed circuit board (PCB) is coupled to the first switching stage of the first printed circuit board (PCB) by two wires.

23. The apparatus of claim 22, further comprising one or more light emitting diodes (LEDs) coupled to the lighting output node.

24. The apparatus of claim 23, wherein the second switching stage of the second printed circuit board (PCB) comprises an energy storage capacitor, and wherein the controller of the second switching stage is configured to control a ripple on the energy storage capacitor to reduce a ripple at the lighting output node.

25. The apparatus of claim 24, wherein the controller of the second switching stage is configured to control a voltage ripple on the energy storage capacitor to reduce a current ripple at the lighting output node.

\* \* \* \* \*